US011864030B2

(12) United States Patent
Wang et al.

(10) Patent No.: US 11,864,030 B2
(45) Date of Patent: Jan. 2, 2024

(54) METHOD AND APPARATUS FOR BINDING INFORMATION MANAGEMENT

(71) Applicant: Telefonaktiebolaget LM Ericsson (publ), Stockholm (SE)

(72) Inventors: Wu Wang, Shanghai (CN); Yunjie Lu, Shanghai (CN); Jinyin Zhu, Shanghai (CN); Zhansheng Wei, Shanghai (CN)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 204 days.

(21) Appl. No.: 17/309,276

(22) PCT Filed: Nov. 13, 2019

(86) PCT No.: PCT/CN2019/118074
§ 371 (c)(1),
(2) Date: May 13, 2021

(87) PCT Pub. No.: WO2020/098706
PCT Pub. Date: May 22, 2020

(65) Prior Publication Data
US 2022/0022101 A1    Jan. 20, 2022

(30) Foreign Application Priority Data

Nov. 13, 2018  (WO) ................ PCT/CN2018/115201

(51) Int. Cl.
*H04W 28/24*    (2009.01)
*H04W 8/26*     (2009.01)
*H04W 60/04*    (2009.01)
(52) U.S. Cl.
CPC ............. *H04W 28/24* (2013.01); *H04W 8/26* (2013.01); *H04W 60/04* (2013.01)

(58) Field of Classification Search
CPC ....... H04W 28/24; H04W 8/26; H04W 60/04; H04W 4/24; H04L 12/1425; H04L 12/1407; H04M 15/8228; H04M 15/66
See application file for complete search history.

(56) References Cited

U.S. PATENT DOCUMENTS 9,398,470 B2 *  7/2016  Roeland ............. H04L 12/1403
9,621,362 B2    4/2017  Livanos et al.
(Continued)

FOREIGN PATENT DOCUMENTS

JP    2010-541361 A    12/2010
JP    2013-516821 A    5/2013
(Continued)

OTHER PUBLICATIONS

Decision to Grant a Patent, JP App. No. 2021-524273, dated Aug. 2, 2022, 5 pages (2 pages of English Translation and 3 pages of Original Document).
(Continued)

*Primary Examiner* — Abdullahi Ahmed
(74) *Attorney, Agent, or Firm* — Nicholson De Vos Webster & Elliott LLP

(57) ABSTRACT

Methods, apparatus and computer program products for binding information management. A method implemented at a policy control node in a wireless communication network comprises: obtaining information indicating a collocated deployment of a session management node and a binding support node (202); and inhibiting, in response to the information, a registration of binding information to the binding support node (204). A policy control node can know that a binding support node is collocated with a session management node, and no registration of binding information to the binding support node will be triggered for the policy control node.

12 Claims, 8 Drawing Sheets

(56) References Cited

U.S. PATENT DOCUMENTS

| | | | |
|---|---|---|---|
| 11,283,883 B1* | 3/2022 | Krishan | H04M 15/8228 |
| 2010/0223282 A1 | 9/2010 | Lataste et al. | |
| 2012/0221723 A1 | 8/2012 | Cutler et al. | |
| 2012/0265888 A1 | 10/2012 | Roeland et al. | |
| 2015/0058414 A1* | 2/2015 | Mann | H04L 63/0892 |
| | | | 709/204 |
| 2015/0172471 A1 | 6/2015 | Castro Castro et al. | |
| 2016/0359750 A1 | 12/2016 | Miklós et al. | |
| 2021/0037375 A1* | 2/2021 | Cakulev | H04W 8/186 |
| 2021/0058366 A1* | 2/2021 | Mas Rosique | H04L 12/1407 |
| 2022/0264264 A1* | 8/2022 | Paczkowski | H04M 15/8228 |

FOREIGN PATENT DOCUMENTS

| | | |
|---|---|---|
| WO | 2016112958 A1 | 7/2016 |
| WO | 2018144697 A1 | 8/2018 |

OTHER PUBLICATIONS

International Search Report and Written Opinion for Application No. PCT/CN2019/118074, dated Feb. 20, 2020, 12 pages.

3GPP TS 23.502 V15.3.0, "3rd Generation Partnership Project; Technical Specification Group Services and System Aspects; Procedures for the 5G System; Stage 2 (Release 15)," Sep. 2018, 330 pages, 3GPP Organizational Partners.

3GPP TS 23.503 V15.3.0, "3rd Generation Partnership Project; Technical Specification Group Services and System Aspects; Policy and Charging Control Framework for the 5G System; Stage 2 (Release 15)," Sep. 2018, 70 pages, 3GPP Organizational Partners.

3GPP TS 29.521 V15.1.0, "3rd Generation Partnership Project; Technical Specification Group Core Network and Terminals; 5G System; Binding Support Management Service; Stage 3 (Release 15)," Sep. 2018, 22 pages, 3GPP Organizational Partners.

International Preliminary Report on Patentability, PCT App. No. PCT/CN2019/118074, dated May 27, 2021, 7 pages.

Extended European Search Report, EP Application No. 19884684.2, dated Nov. 29, 2021, 12 pages.

Ericsson, "Solving the PCF Default Notification URI," Nov. 27-Dec. 1, 2017, 5 pages, 3GPP TSG-CT WG3 Meeting #93, C3-176043, Reno, Nevada.

Ericsson, "PCF id correction for BSF," Jul. 9-13, 2018, 4 pages, 3GPP TSG-CT WG3 Meeting #97Bis, C3-184177, Sophia Antipolis, France.

Communication pursuant to Article 94(3) EPC, EP App. No. 19884684.2, dated Feb. 27, 2023, 10 pages.

Communication pursuant to Article 94(3) EPC, EP App. No. 19884684.2, dated Sep. 15, 2023, 9 pages.

* cited by examiner

METHOD AND APPARATUS FOR BINDING INFORMATION MANAGEMENT

CROSS-REFERENCE TO RELATED APPLICATIONS

This application is a National stage of International Application No. PCT/CN2019/118074, filed Nov. 13, 2019, which claims priority to International Application No. PCT/CN2018/115201, filed Nov. 13, 2018, which are hereby incorporated by reference.

TECHNICAL FIELD

The non-limiting and exemplary embodiments of the present disclosure generally relate to the technical field of wireless communications, and specifically to methods, apparatuses and computer programs for binding information management.

BACKGROUND

This section introduces aspects that may facilitate a better understanding of the disclosure. Accordingly, the statements of this section are to be read in this light and are not to be understood as admissions about what is in the prior art or what is not in the prior art.

In a wireless communication network, such as a new radio (NR)/fifth generation (5G) network, a binding support node, e.g. Binding Support Function (BSF) in 5G core network, is an entity for providing a binding support management service. The binding support management service is defined in 3GPP TS 23.502, TS 23.503 and TS 29.521.

The BSF can store binding information for a certain protocol data unit (PDU) session, such as user identity, data network name (DNN), IP or Ethernet address of user equipment (UE), data network (DN) information (e.g. Single Network Slice Selection Assistance Information (S-NSSAI)), and a selected Policy Control Function (PCF) address. Moreover, the BSF can discover the selected PCF according to the binding information. The BSF also allows network function (NF) consumers to retrieve the binding information and to discover the selected PCF.

On the other hand, the PCF can register, update and remove the binding information from the BSF. The binding information registered by the PCF may further comprise Diameter related attribute information, such as pcfDiamHost and pcfDiamRealm, in addition to the above binding information for the PDU session.

In the 5G core network, the BSF may be deployed standalone or may be collocated with other network function node, such as Session Management Function (SMF). In either case, the PCF will register, update and remove the binding information from the BSF.

In the case where the BSF is collocated with the SMF, the binding information for a PDU session can be obtained and stored locally in the SMF during the PDU session establishment. Due to the collocated deployment of the SMF and BSF, the BSF can derive the binding information internally from the SMF. When the PDU session is terminated, the binding information can be removed locally. Therefore, it is not necessary for the PCF to register, update and remove the binding information from the BSF.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure proposes a solution of binding information management in a wireless communication network, so as to make a policy control node know whether a binding support node is collocated with a session management node.

In a first aspect of the disclosure, there is provided a method implemented at a policy control node in a wireless communication network. The method comprises transmitting, to the session management node, Diameter related attribute information of the policy control node.

In some embodiment, the Diameter related attribute information may be transmitted to the session management node via a network repository node.

In some embodiment, the Diameter related attribute information may be transmitted to the network repository node.

In some embodiment, the Diameter related attribute information may be transmitted during a registration procedure of the policy control node.

In some embodiment, the Diameter related attribute information may be transmitted in a session management policy association create response.

In some embodiments, the Diameter related attribute information may be transmitted in a session management policy association modification response.

In some embodiments, the Diameter related attribute information may be transmitted when an IP address of a terminal device in a session is changed.

In some embodiments, the Diameter related attribute information may comprise an identifier of a diameter host and a diameter realm for the policy control node.

In some embodiments, the method may further comprise obtaining information indicating a collocated deployment of a session management node and a binding support node; and inhibiting, in response to the information, a registration of binding information to the binding support node.

In some embodiments, the information indicating a collocated deployment of a session management node may receive from the session management node, the information in a session management policy association create request.

In some embodiments, the information indicating a collocated deployment of a session management node may receive from the session management node, the information in a session management policy association modification request.

In some embodiments, the information indicating a collocated deployment of a session management node may receive, from the network repository node, the information during a discovery procedure for the network repository node.

In a second aspect of the disclosure, there is provided a method implemented at a session management node in a wireless communication network. The method comprises receiving, from a policy control node, Diameter related attribute information of the policy control node.

In some embodiment, the information may be received, from the policy control node, Diameter related attribute information of the policy control node via a network repository node.

In some embodiment, the information may be received, from a network repository node, Diameter related attribute information of the policy control node.

In some embodiment, the Diameter related attribute information may be received during a registration procedure for the policy control node.

In some embodiment, the Diameter related attribute information may be received in a session management policy association create response.

In some embodiment, the Diameter related attribute information may be received in a session management policy association modification response.

In some embodiment, the Diameter related attribute information may be received when an IP address of a terminal device in a session is changed.

In some embodiment, the Diameter related attribute information may comprise an identifier of a diameter host and a diameter realm for the policy control node.

In some embodiment, the method may further comprise transmitting, to the policy control node, information indicating a collocated deployment of a session management node and a binding support node.

In some embodiment, the information indicating the collocated deployment of the session management node and the binding support node may be transmitted, to the policy control node, in a session management policy association create request.

In some embodiment, the information indicating the collocated deployment of the session management node and the binding support node may be transmitted, to the policy control node, in a session management policy association modification request.

In a third aspect of the disclosure, there is provided a method implemented at a binding support node in a wireless communication network. The method comprises transmitting, to a network repository node, information indicating a collocated deployment of a session management node and the binding support node.

In some embodiments, the information may be information may be transmitted during a registration procedure for the binding support node.

In a fourth aspect of the disclosure, there is provided a method implemented at a network repository node in a wireless communication network. The method comprises receiving, from a policy control node, Diameter related attribute information of the policy control node; and transmitting the Diameter related attribute information to the session management node.

In some embodiments, the Diameter related attribute information may be received during a registration procedure for the policy control node.

In some embodiments, the Diameter related attribute information may be transmitted during a discovery procedure for the policy control node initiated by the session management node.

In some embodiments, Diameter related attribute information may comprise an identifier of a diameter host and a diameter realm for the policy control node.

In some embodiments, the method may further comprise receiving, from a binding support node, information indicating a collocated deployment of a session management node and a binding support node during a registration procedure for the binding support node; and transmitting, to the policy control node, the information during a discovery procedure for the policy control node.

In a fifth aspect of the disclosure, there is provided a policy control node in a wireless communication network. The policy control node comprises one or more processors and one or more memories coupled to the one or more processors. The one or more memories may contain computer program codes executable by the one or more processors, whereby the policy control node is operative to perform the method according to the first aspect of the present disclosure.

In a sixth aspect of the disclosure, there is provided a session management node in a wireless communication network. The session management node comprises one or more processors and one or more memories coupled to the one or more processors. The one or more memories may contain computer program codes executable by the one or more processors, whereby the session management node is operative to perform the method according to the second aspect of the present disclosure.

In a seventh aspect of the disclosure, there is provided a binding support node in a wireless communication network. The binding support node comprises one or more processors and one or more memories coupled to the one or more processors. The one or more memories may contain computer program codes executable by the one or more processors, whereby the binding support node is operative to perform the method according to the third aspect of the present disclosure.

In an eighth aspect of the present disclosure, there is provided a network repository node in a wireless communication network. The network repository node comprises one or more processors and one or more memories coupled to the one or more processors. The one or more memories may contain computer program codes executable by the one or more processors, whereby the network repository node is operative to perform the method according to the fourth aspect of the present disclosure.

In a ninth aspect of the present disclosure, there is provided a computer program product being tangibly stored on a computer readable storage medium and including instructions which, when executed on at least one processor, cause the at least one processor to carry out the method according to the first aspect of the disclosure.

In a tenth aspect of the disclosure, there is provided a computer program product being tangibly stored on a computer readable storage medium and including instructions which, when executed on at least one processor, cause the at least one processor to carry out the method according to the second aspect of the disclosure.

In an eleventh aspect of the disclosure, there is provided a computer program product being tangibly stored on a computer readable storage medium and including instructions which, when executed on at least one processor, cause the at least one processor to carry out the method according to the third aspect of the disclosure.

In a twelfth aspect of the disclosure, there is provided a computer program product being tangibly stored on a computer readable storage medium and including instructions which, when executed on at least one processor, cause the at least one processor to carry out the method according to the fourth aspect of the disclosure.

In a thirteenth aspect of the disclosure, there is provided a method implemented at a policy control node in a wireless communication network. The method comprises obtaining information indicating a collocated deployment of a session management node and a binding support node. The method further comprises inhibiting, in response to the information, a registration of binding information to the binding support node.

In some embodiment, obtaining information indicating a collocated deployment of a session management node and a binding support node may comprise receiving the information from a session management node.

In some embodiment, the information may be received in a session management policy association create request.

In some embodiment, the information may be received in a session management policy association modification request.

In some embodiment, the information may be received when an IP address of a terminal device in a session is changed.

In some embodiments, obtaining information indicating a collocated deployment of a session management node and a binding support node may comprise receiving the information from a network repository node.

In some embodiments, the information may be received during a discovery procedure for the binding support node initiated by the policy control node.

In some embodiments, the policy control node may be configured with a correspondence between identification information for a terminal device and information indicating a collocated deployment of a session management node and a binding support node. In an embodiment, obtaining information indicating a collocated deployment of a session management node and a binding support node may comprise retrieving, in response to an identification of a terminal device, the information from the correspondence.

In some embodiments, the method may further comprise transmitting, to the session management node, Diameter related attribute information of the policy control node, in response to inhibiting the registration.

In some embodiments, the Diameter related attribute information may be transmitted in a session management policy association create response.

In some embodiments, the Diameter related attribute information may be transmitted in a session management policy association modification response.

In some embodiments, the Diameter related attribute information may be transmitted when an IP address of a terminal device in a session is changed.

In some embodiments, the method may further comprise transmitting, to a network repository node, Diameter related attribute information of the policy control node.

In some embodiments, the Diameter related attribute information is transmitted during a registration procedure of the policy control node.

In some embodiments, the Diameter related attribute information may comprise an identifier of a diameter host and a diameter realm for the policy control node.

In a fourteenth aspect of the disclosure, there is provided a method implemented at a session management node in a wireless communication network. The method comprises transmitting, to a policy control node, information indicating a collocated deployment of the session management node and a binding support node.

In some embodiment, the information may be transmitted in a session management policy association create request.

In some embodiments, the information may be transmitted in a session management policy association modification request.

In some embodiments, the information may be transmitted when an IP address of a terminal device in a session is changed.

In some embodiments, the method may further comprise obtaining Diameter related attribute information of the policy control node.

In some embodiments, obtaining Diameter related attribute information of the policy control node may comprise receiving the Diameter related attribute information from the policy control node.

In some embodiments, the Diameter related attribute information may be received in a session management policy association create response.

In some embodiments, the Diameter related attribute information may be received in a session management policy association modification response.

In some embodiments, the Diameter related attribute information may be received when an IP address of a terminal device in a session is changed.

In some embodiments, obtaining Diameter related attribute information of the policy control node may comprise receiving the Diameter related attribute information from a network repository node.

In some embodiments, the Diameter related attribute information may be received during a discovery procedure for the policy control node.

In a fifteenth aspect of the disclosure, there is provided a method implemented at a binding support node in a wireless communication network. The method comprises transmitting, to a network repository node, information indicating a collocated deployment of a session management node and the binding support node.

In some embodiments, the information may be transmitted during a registration procedure for the binding support node.

In a sixteenth aspect of the disclosure, there is provided a method implemented at a network repository node in a wireless communication network. The method comprises receiving, from a binding support node, information indicating a collocated deployment of a session management node and the binding support node.

In some embodiments, the information may be received during a registration procedure for the binding support node.

In some embodiments, the method may further comprise transmitting the information to a policy control node.

In some embodiments, the information may be transmitted during a discovery procedure for the binding support node initiated by the policy control node.

In some embodiments, the method may further comprise receiving, from a policy control node, Diameter related attribute information of the policy control node.

In some embodiments, the Diameter related attribute information may be received during a registration procedure for the policy control node.

In some embodiments, the method may further comprise transmitting the Diameter related attribute information to the session management node.

In some embodiments, the Diameter related attribute information may be transmitted during a discovery procedure for the policy control node initiated by the session management node.

In a seventeenth aspect of the disclosure, there is provided a policy control node in a wireless communication network. The policy control node comprises one or more processors and one or more memories coupled to the one or more processors. The one or more memories may contain computer program codes executable by the one or more processors, whereby the policy control node is operative to perform the method according to the first aspect of the present disclosure.

In a eighteenth aspect of the disclosure, there is provided a session management node in a wireless communication network. The session management node comprises one or more processors and one or more memories coupled to the one or more processors. The one or more memories may contain computer program codes executable by the one or more processors, whereby the session management node is operative to perform the method according to the second aspect of the present disclosure.

In a nineteenth aspect of the disclosure, there is provided a binding support node in a wireless communication network. The binding support node comprises one or more processors and one or more memories coupled to the one or more processors. The one or more memories may contain computer program codes executable by the one or more processors, whereby the binding support node is operative to perform the method according to the third aspect of the present disclosure.

In an twentieth aspect of the present disclosure, there is provided a network repository node in a wireless communication network. The network repository node comprises one or more processors and one or more memories coupled to the one or more processors. The one or more memories may contain computer program codes executable by the one or more processors, whereby the network repository node is operative to perform the method according to the fourth aspect of the present disclosure.

In a twenty-first aspect of the present disclosure, there is provided a computer program product being tangibly stored on a computer readable storage medium and including instructions which, when executed on at least one processor, cause the at least one processor to carry out the method according to the first aspect of the disclosure.

In a twenty-second aspect of the disclosure, there is provided a computer program product being tangibly stored on a computer readable storage medium and including instructions which, when executed on at least one processor, cause the at least one processor to carry out the method according to the second aspect of the disclosure.

In a twenty-third aspect of the disclosure, there is provided a computer program product being tangibly stored on a computer readable storage medium and including instructions which, when executed on at least one processor, cause the at least one processor to carry out the method according to the third aspect of the disclosure.

In a twenty-fourth aspect of the disclosure, there is provided a computer program product being tangibly stored on a computer readable storage medium and including instructions which, when executed on at least one processor, cause the at least one processor to carry out the method according to the fourth aspect of the disclosure.

According to the various aspects and embodiments as mentioned above, the policy control node can know that the binding support node is collocated with the session management node and does not need to register the binding information from the binding support node, thereby reducing message transmissions between the binding support node and the policy control node. And the Rx diameter information could be used by other Network Function, for example, to get the Diameter Interface configuration change and update the Diameter information.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
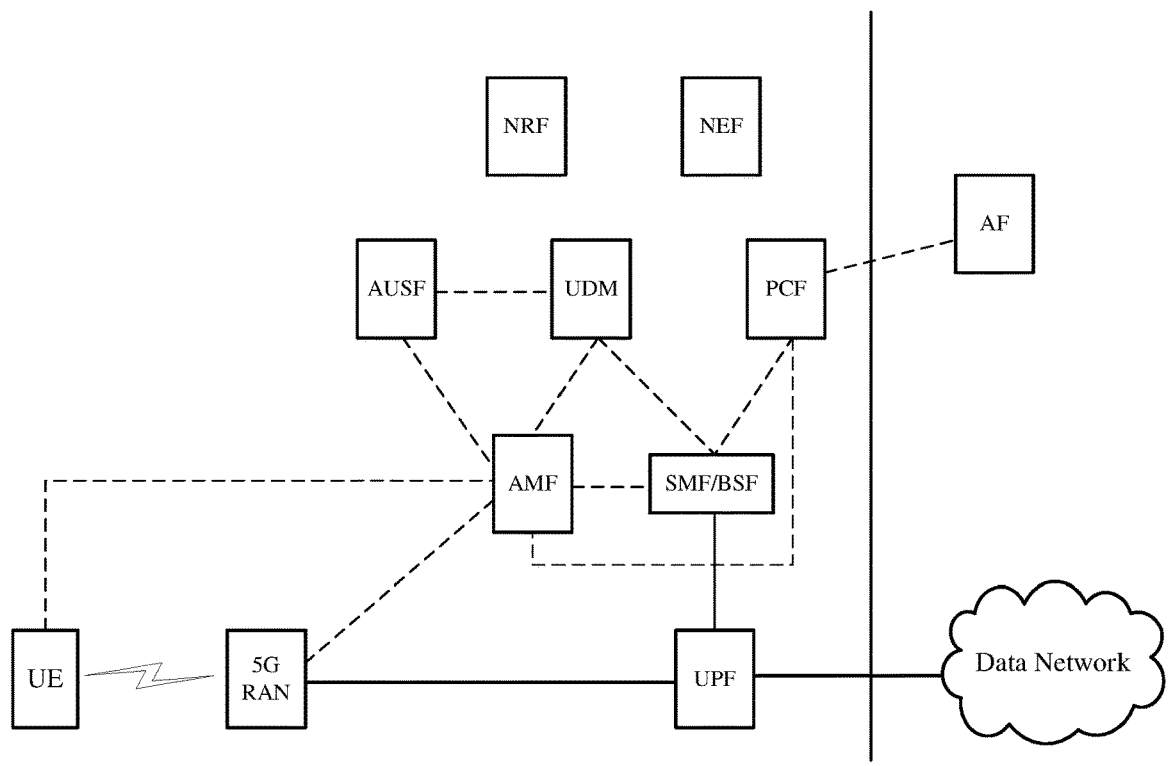
FIG. 1 illustrates a schematic diagram of a 5G core network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on.

The term "terminal device" refers to any end device that can access a communication network and receive services therefrom. By way of example and not limitation, the terminal device may refer to a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As described above, if the BSF is deployed collocated with the SMF in the 5G core network, the binding information for a PDU session can be stored locally in the collocated BSF/SMF. In this case, the PCF does not need to register, update and remove the binding information from the BSF. But the PCF does not know whether the BSF is collocated with the SMF, and thus always register, update, and remove the binding information from the BSF. Therefore, there may be unnecessary procedures for registering, updating and removing the binding information between the PCF and the BSF.

Therefore, it is desirable to provide a new mechanism for binding information management to overcome the above mentioned problems.

In accordance with some exemplary embodiments, the present disclosure provides a solution to cause the policy control node to know whether the binding support node is collocated with the SMF, and further to decide whether to register, update or remove the binding information. According to the proposed solution, the policy control node may obtain information indicating a collocated deployment of the binding support node and the session management node. In response to the information, the policy control node may inhibit a registration of the binding information to the binding support node.

It is noted that some embodiments of the present disclosure are mainly described in relation to 5G specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments and does not limit the present disclosure naturally in any way. Rather, any other system configuration or radio technologies may equally be utilized as long as exemplary embodiments described herein are applicable.

FIG. 1 shows a schematic diagram of a 5G core network in which some embodiments of the present disclosure can be implemented. As shown in FIG. 1, the 5G core network may comprise Access and Mobility Function (AMF), Session Management Function (SMF), Authentication Service Function (AUSF), Unified Data Management (UDM), User Plane Function (UPF), Policy Control Function (PCF), Binding Support Function (BSF), Application Function (AF), Network Exposure Function (NEF), and Network Repository Function (NRF). Network Functions (NFs) such as AMF, SMF, PCF, or BSF can register their services with the NRF. In 5G core network as shown in FIG. 1, the BSF is collocated with the SMF.

Figure 2:
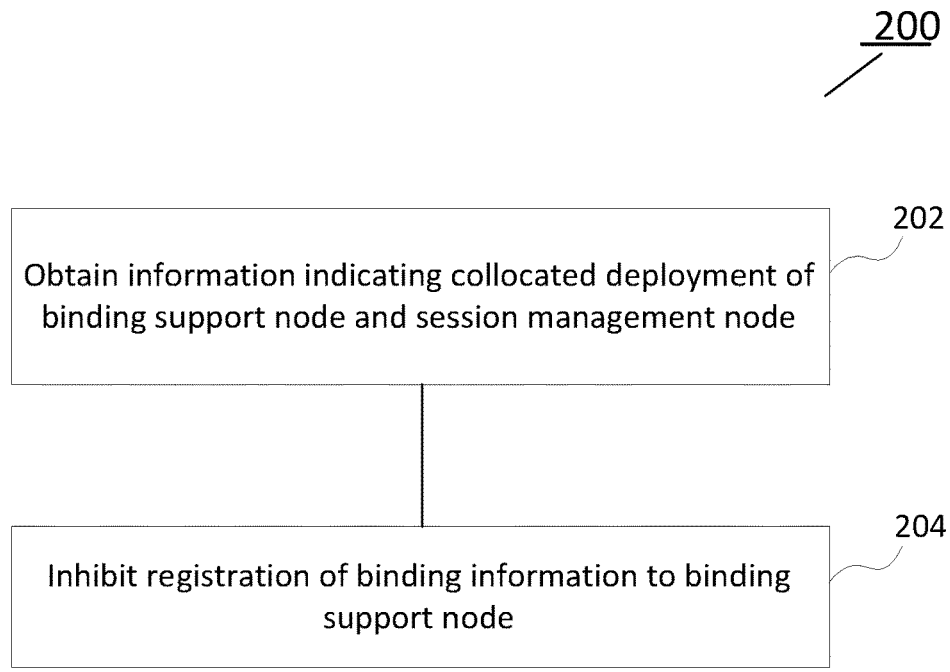
FIG. 2 illustrates a flowchart of a method implemented at a policy control node in a wireless communication network according to some embodiments of the present disclosure.

Reference is now made to FIG. 2, which shows a flowchart of a method 200 according to some embodiments of the present disclosure. The method 200 may be implemented at a policy control node (e.g. PCF as shown in FIG. 1).

As shown in FIG. 2, the method 200 may comprise: obtaining information indicating a collocated deployment of a session management node and a binding support node at block 202; and inhibiting, in response to the information, a registration of binding information to the binding support node at block 204.

According to the exemplary method 200 illustrated in FIG. 2, the policy control node may obtain information indicating a collocated deployment of a session management node and a binding support node, as shown in block 202. In some embodiments, the session management node may be SMF as shown in FIG. 1, and the binding support node may be BSF as shown in FIG. 1. In some embodiments, the information indicating the collocated deployment of the session management node and the binding support node may be represented by an indicator with 1 bit.

Figure 3:
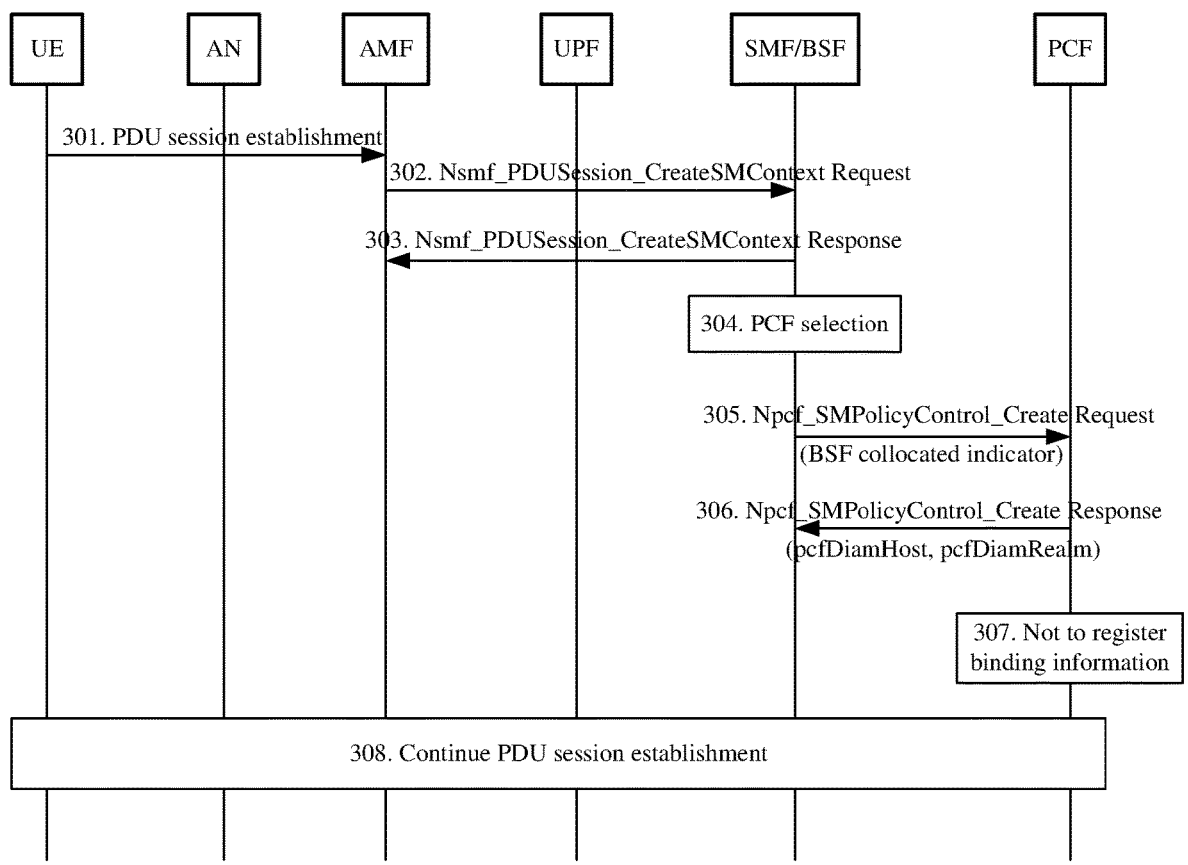
FIG. 3 illustrates a first exemplary flow of a process for obtaining information indicating a collocated deployment.
Figure 4:
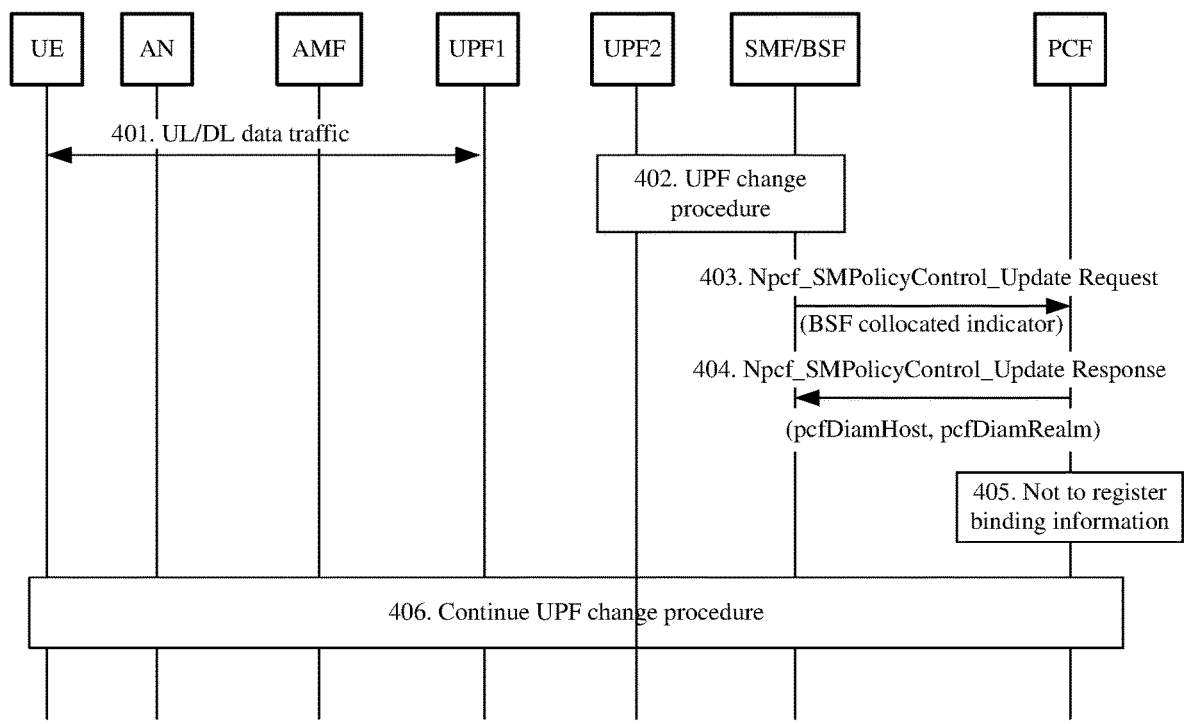
FIG. 4 illustrates a second exemplary flow of a process for obtaining information indicating a collocated deployment.

In accordance with some exemplary embodiments, the policy control node may receive the information from the session management node. FIGS. 3 and 4 show two exemplary flows of receiving the information from the session management node such as SMF.

In FIG. 3, the PCF receives the information during a session management (SM) policy association establishment procedure. As shown in FIG. 3, user equipment (UE) requests a PDU session establishment procedure from the AMF, at 301. At 302, the AMF requests to create a SM context for the PDU session by sending Nsmf_PDUSession_CreateSMContext Request to the SMF. The SMF replies with Nsmf_PDUSession_CreateSMContext Response to the AMF, at 303. Then the SMF performs a PCF selection by initiating a network function discovery procedure with the NRF, at 304. After selecting the PCF, the SMF performs the SM policy association establishment procedure with the PCF. During the SM policy association establishment procedure, the SMF transmits a SM management policy association create request, Npcf_SMPolicyControl_Create Request, to the PCF at 305. When the BSF is collocated with the SMF, the SM management policy association create request additionally comprises the information indicating the collocated deployment of the SMF and the BSF. For example, the information may be represented by a BSF collocated indicator which indicates that a BSF is collocated with the SMF. After receiving the request, the PCF can know that the BSF is collocated with the SMF according to the BSF collocated indicator. Then the PCF replies with a SM management policy association create response, Npcf_SMPolicyControl_Create Response, to the SMF at 306. At 307, the PCF decides not to register the binding information from the BSF as the binding information will be stored in the collocated SMF and BSF after the PDU session establishment procedure. Accordingly, the PCF will not update and remove the binding information from the BSF. The BSF can derive the binding information internally from the SMF. Then the PDU session establishment procedure continues at 308.

In FIG. 4, the PCF receives the information during a SM policy association modification procedure. As shown in FIG. 4, after the PDU session is established, there are uplink (UL) and/or downlink (DL) data transmissions on the session between the UE and UPF1, at 401. During the session, when the UE moves into a new location and an IP address of the UE needs to be reallocated, at 402, the SMF decides to allocate the ongoing PDU session with a new PDU session anchor, UPF2, and initiates a UPF change procedure. Then the SMF performs a SM policy association modification procedure with the PCF. During the SM policy association modification procedure, the SMF sends a SM policy association modification request, Npcf_SMPolicyControl_Update Request, to the PCF, at 403. When the BSF is collocated with the SMF, the SM policy association modification request can comprise the information indicating the collocated deployment of the BSF and SMF. Such information may be represented by the BSF collocated indicator. At 404, the PCF replies the SMF with a SM policy association modification response, Npcf_SMPolicyControl_Update Response. Moreover, the PCF can know that the BSF is collocated with the SMF, and decides not to register the binding information from the BSF, at 405. Accordingly, the PCF will not update and remove the binding information from the BSF. Then the UPF change procedure continues, at 406.

Figure 5:
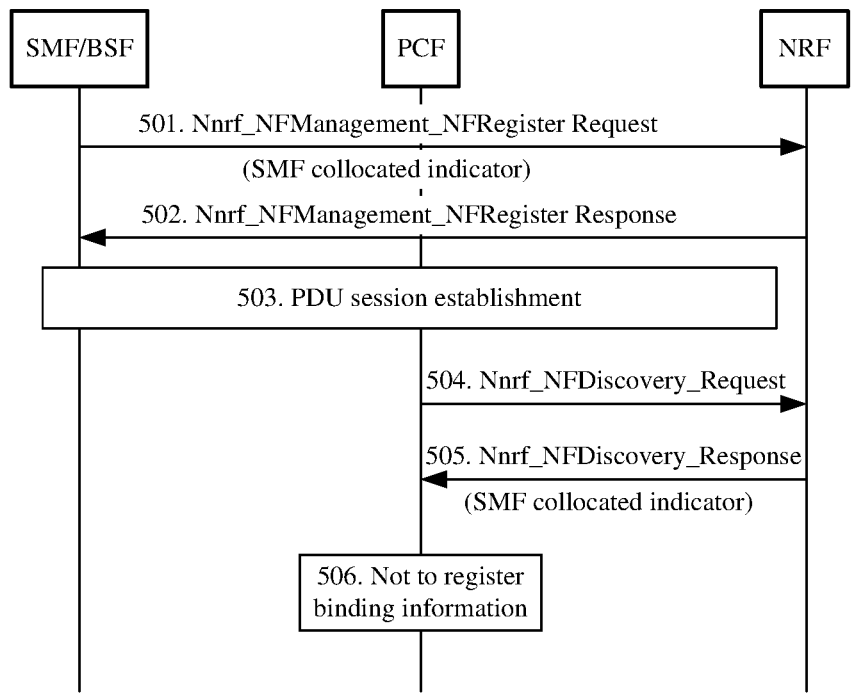
FIG. 5 illustrates a third exemplary flow of a process for obtaining information indicating a collocated deployment.

In accordance with some exemplary embodiments, the policy control node may receive the information from the network repository node, e.g. NRF as shown in FIG. 1. FIG. 5 shows an exemplary flow of receiving the information from the network repository node such as NRF.

In FIG. 5, the PCF receives the information during a discovery procedure for the BSF initiated by the PCF. As shown in FIG. 5, the BSF registers its service to the NRF by providing its NF profile to the NRF, at 501. For example, the BSF sends a registration request, Nnrf_NFManagement_NFRegister Request, including the NF profile. When the BSF is collocated with the SMF, the BSF includes the information indicating the collocated deployment of the BSF and SMF and a range of IP addresses in the SMF into the NF profile. For example, such information may be represented by a SMF collocated indicator which indicates that a SMF is collocated with the BSF. Then the NRF replies with a registration response, Nnrf_NFManagement_NFRegister Response, to the BSF at 502. After a PDU session establishment is started at 503, when the PCF needs to register its binding information, the PCF initiates a discovery procedure for the BSF. In the discovery procedure, the PCF sends a discovery request, Nnrf_NFDiscovery_Request, to the NRF, at 504. The NRF replies with a discovery response, Nnrf_NFDiscovery_Response, to the PCF, at 505. The discovery response may comprise the NF profile of the BSF, which includes the SMF collocated indicator and the range of IP addresses. After receiving the discovery response, the PCF can know that the SMF is collocated with the BSF based on the SMF collocated indicator, and thus decides not to register its binding information from the BSF, at 506. Accordingly, the PCF will not update and remove the binding information from the BSF.

In accordance with some exemplary embodiments, the policy control node may be configured with a correspondence between identification information for a terminal device and the information indicating a collocated deployment of a session management node and a binding support node. In an embodiment, the correspondence may be stored in a lookup table. In an embodiment, the identification information for a terminal device may be a range of IP addresses. Thus the lookup table may store the range of IP addresses and the corresponding collocated session management node and binding support node. In another embodiment, the identification information may be an IP domain.

Figure 6:
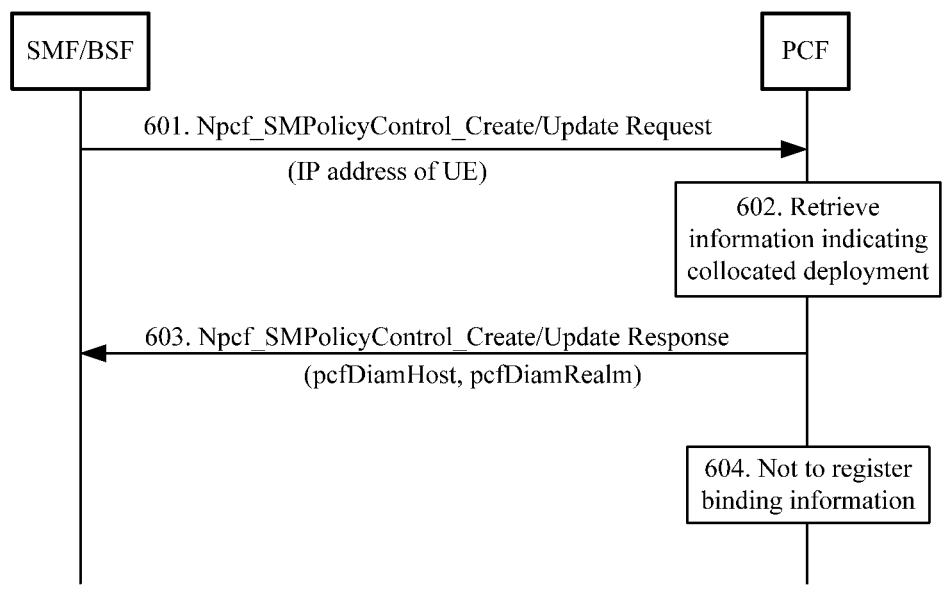
FIG. 6 illustrates a fourth exemplary flow of a process for obtaining information indicating a collocated deployment.

FIG. 6 shows an exemplary flow of obtaining the information based on local configuration of the PCF. As shown in FIG. 6, in the SM policy association establishment procedure or SM policy association modification procedure, the SMF sends the SM policy association create request, Npcf_SMPolicyControl_Create Request, or the SM policy association modification request, Npcf_SMPolicyControl_Update Request, to the PCF, at 601. The request includes the IP address of the UE. The PCF may check the lookup table based on the IP address of the UE to retrieve the information, at 602. Then the PCF replies with the SM policy association create response, Npcf_SMPolicyControl_Create Response, or the SM policy association modification response, Npcf_SMPolicyControl_Update Response, at 603. If the IP address of the UE is within the range of IP addresses, the PCF can know that a BSF is collocated with the SMF, and decides not to register its binding information from the BSF, at 604.

Back to FIG. 2, at block 204, in response to the information, the policy control node inhibits the registration of the binding information to the BSF. Accordingly, the policy control node will not update and remove the binding information.

With the embodiments as described above, the policy control node can know whether the binding support node is collocated with the session management node, and will not trigger the registration, update and removal of the binding information from the binding support node. In this way, unnecessary procedures of registering, updating and removing the binding information between the policy control node and the binding support node collocated with the session management node can be avoided, and the loads of the policy control node and the binding support node can be reduced, and the control signaling can be reduced.

Figure 7:
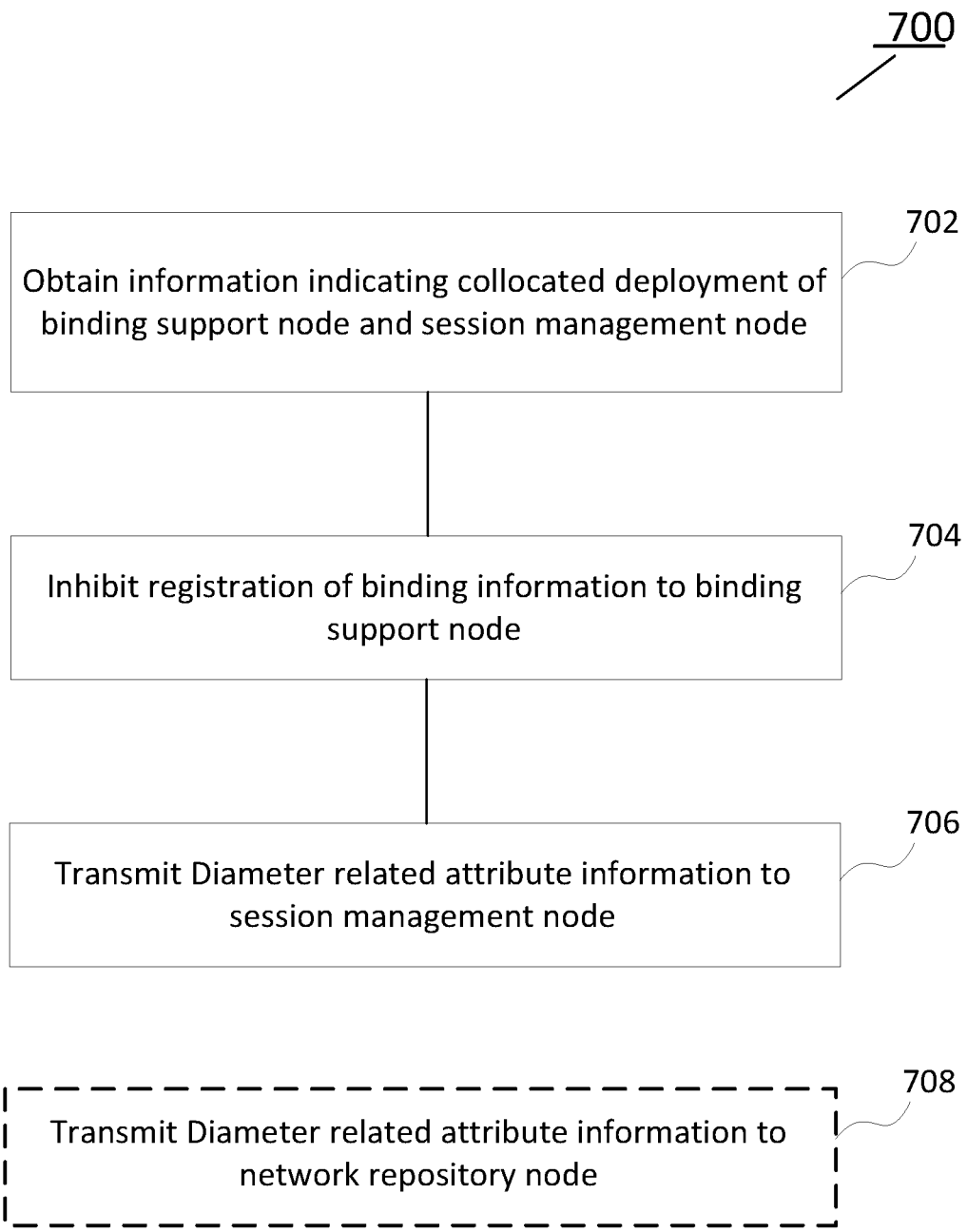
FIG. 7 illustrates a flowchart of a method implemented at a policy control node in a wireless communication network according to some embodiment of the present disclosure.

FIG. 7 shows a flowchart of a method 700 according to some embodiments of the present disclosure. The method 700 may be implemented at the policy control node (e.g. PCF as shown in FIG. 1).

In the method 700 as shown in FIG. 7, the operations in blocks 702 and 704 are the same as those in blocks 202 and 204 as shown in FIG. 2, and thus their descriptions are omitted herein.

Additionally, in some embodiments, in response to inhibiting the registration at block 704, the policy control node may transmit its Diameter related attribute information to the session management node at block 706. As described above, the Diameter related attribute information needs to be registered by the policy control node to the binding support node. The session management node cannot obtain the Diameter related attribute information during the session establishment procedure. Therefore, when the binding support node is collocated with the session management node, the binding support node cannot obtain the Diameter related attribute information if the policy support node does not register its binding information to the binding support node. In order to make the collocated binding support node and session management node maintain all the binding information of the policy control node, the policy control node will additionally transmit the Diameter related attribute information to the session management node.

As described above, the Diameter related attributed information includes two attributes: pcfDiamHost and pcfDiamRealm. The attribute pcfDiamHost indicates an identifier of a diameter host for an individual policy control node, and is provided by a PCF supporting Rx interface. The attribute pcfDiamRealm indicates a diameter realm for the policy control node, and is provided by the PCF supporting Rx interface.

In some embodiments, the policy control node may transmit the Diameter related attribute information in the session management policy association create response, Npcf_SMPolicyControl_Create Response, as shown in 306 of FIG. 3 or 603 of FIG. 6.

In some embodiments, the policy control node may transmit the Diameter related attribute information in the session management policy association modification response, Npcf_SMPolicyControl_Update Response, as shown in 404 of FIG. 4.

Figure 8:
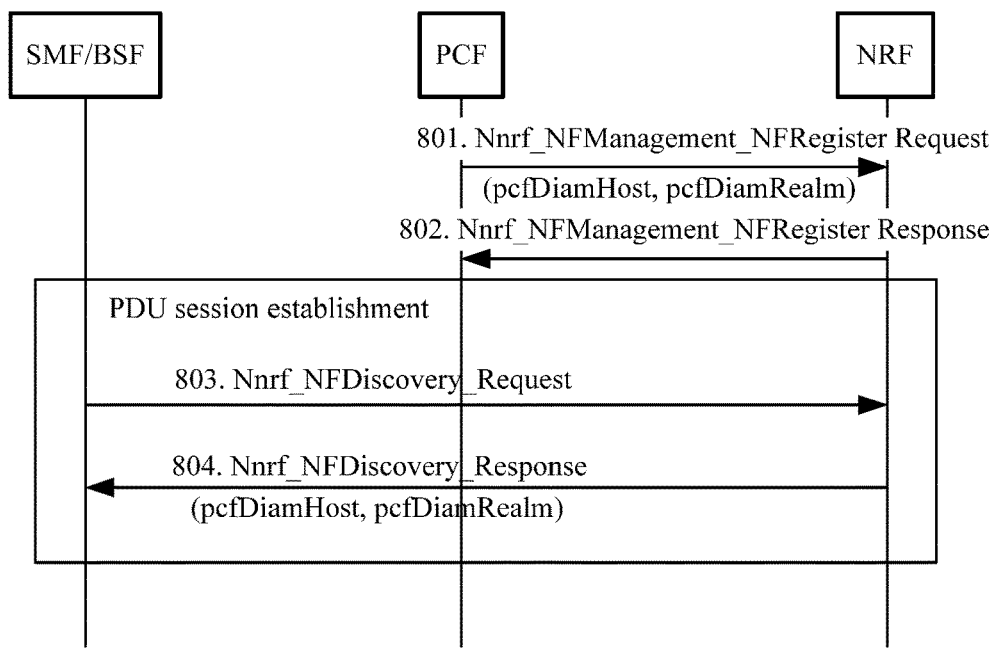
FIG. 8 illustrates an exemplary flow of the transmission of Diameter related attribute information.

Additionally, in some embodiments, at block 708, the policy control node may transmit its Diameter related attribute information to the network repository node, e.g. NRF as shown in FIG. 1. FIG. 8 shows an exemplary flow of the transmission of Diameter related attribute information.

In FIG. 8, the PCF transmits the Diameter related attribute information during a registration procedure with the NRF. At 801, the PCF sends a registration request, Nnrf_NFManagement_NFRegister Request, to the NRF to register its service. The registration request may comprise a NF profile of the PCF, and the NF profile may comprise the attributes pcfDiamHost and pcfDiamRealm. The NRF replies with a registration response, Nnrf_NFManagement_NFRegister Response, to the PCF at 802. Then during the PDU session establishment procedure, the SMF initiates a network function discovery procedure with the NRF to select the PCF. In the discovery procedure, the SMF sends a discovery request, Nnrf_NFDiscovery_Request, to the NRF at 803. Then the NRF replies with a discovery response, Nnrf_NFDiscovery_Response, to the SMF at 804. The discovery response may comprise the attributes pcfDiamHost and pcfDiamRealm.

With the embodiments as described above, the Diameter related attribute information of the policy control node can be provided to the collocated binding support node and session management node, to make the collocated binding support node and session management node maintain all the binding information of the policy control node.

Figure 9:
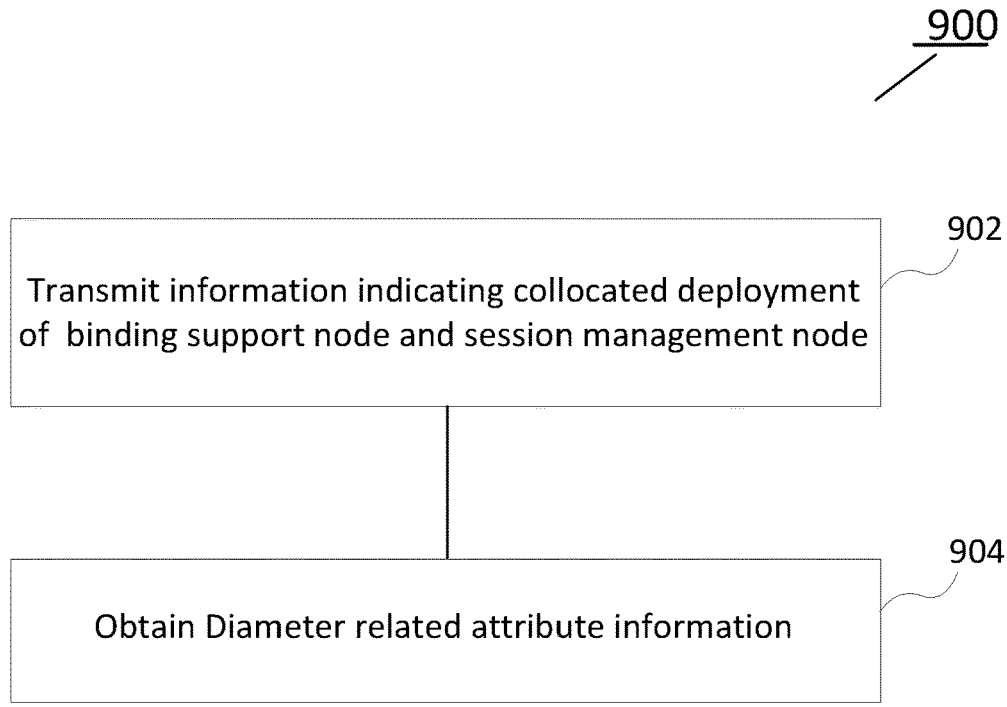
FIG. 9 illustrates a flowchart of a method implemented at a session management node in a wireless communication network according to some embodiments of the present disclosure.

FIG. 9 illustrates a flowchart of a method 900 according to some embodiments of the present disclosure. The method 900 may be implemented at the session management node such as SMF as shown in FIG. 1.

As shown in FIG. 9, the session management node may transmit, to a policy control node, information indicating a collocated deployment of the session management node and a binding support node. In some embodiments, the policy control node may be the PCF as shown in FIG. 1, and the binding support node may be the BSF as shown in FIG. 1.

In some embodiments, the session management node may transmit the information in the session management policy association create request during the session establishment procedure. For example, the session management policy association create request may be Npcf_SMPolicyControl_Create Request as shown in 305 of FIG. 3.

In some embodiments, the session management node may transmit the information in the session management policy association modification request. For example, the session management policy association modification request may be Npcf_SMPolicyControl_Update Request as shown in 403 of FIG. 4.

Additionally, in some embodiments, the session management node may obtain the Diameter related attribute information of the policy control node, at block 904. As described above the Diameter related attribute information comprises an identifier of a diameter host and a diameter realm for the policy control node.

In some embodiments, the session management node may receive the Diameter related attribute information from the policy control node. In an embodiment, the Diameter related attribute information may be received in the session management policy association create response, such as Npcf_SMPolicyControl_Create Response as shown in 306 of FIG. 3. In another embodiment, the session management node may receive the Diameter related attribute information in the session management policy association modification response, such as Npcf_SMPolicyControl_Update Response, as shown in 404 of FIG. 4.

In some embodiments, the session management node may receive the Diameter related attribute information from the network repository node. As described above, the policy control node can register its service with the network repository node by providing its NF profile. The NF profile may comprise the Diameter related attribute information. During the session establishment procedure, the session management node may initiate the discovery procedure with the network repository node to select the policy control node. Then the network repository node may send the Diameter related attribute information to the session management node. In an embodiment, the session management node may receive the Diameter related attribute information in the discovery response, such as Nnrf_NFDiscovery_Response as shown in 804 of FIG. 8.

Figure 10:
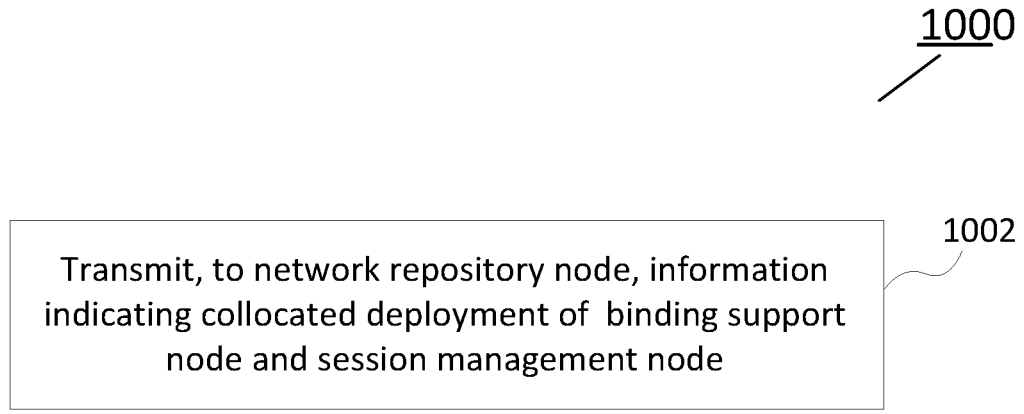
FIG. 10 illustrates a flowchart of a method implemented at a binding support node in a wireless communication network according to some embodiment of the present disclosure.

FIG. 10 illustrates a flowchart of a method 1000 according to some embodiments of the present disclosure. The method 1000 may be implemented at the binding support node such as BSF as shown in FIG. 1.

As shown in FIG. 10, the binding support node may transmit, to the network repository node, the information indicating a collocated deployment of a session management node and the binding support node, at block 1002.

In some embodiments, the binding support node may transmit the information during the registration procedure. For example, the information may be transmitted in a registration request such as Nnrf_NFManagement_NFRegister Request as shown in 501 of FIG. 5.

Figure 11:
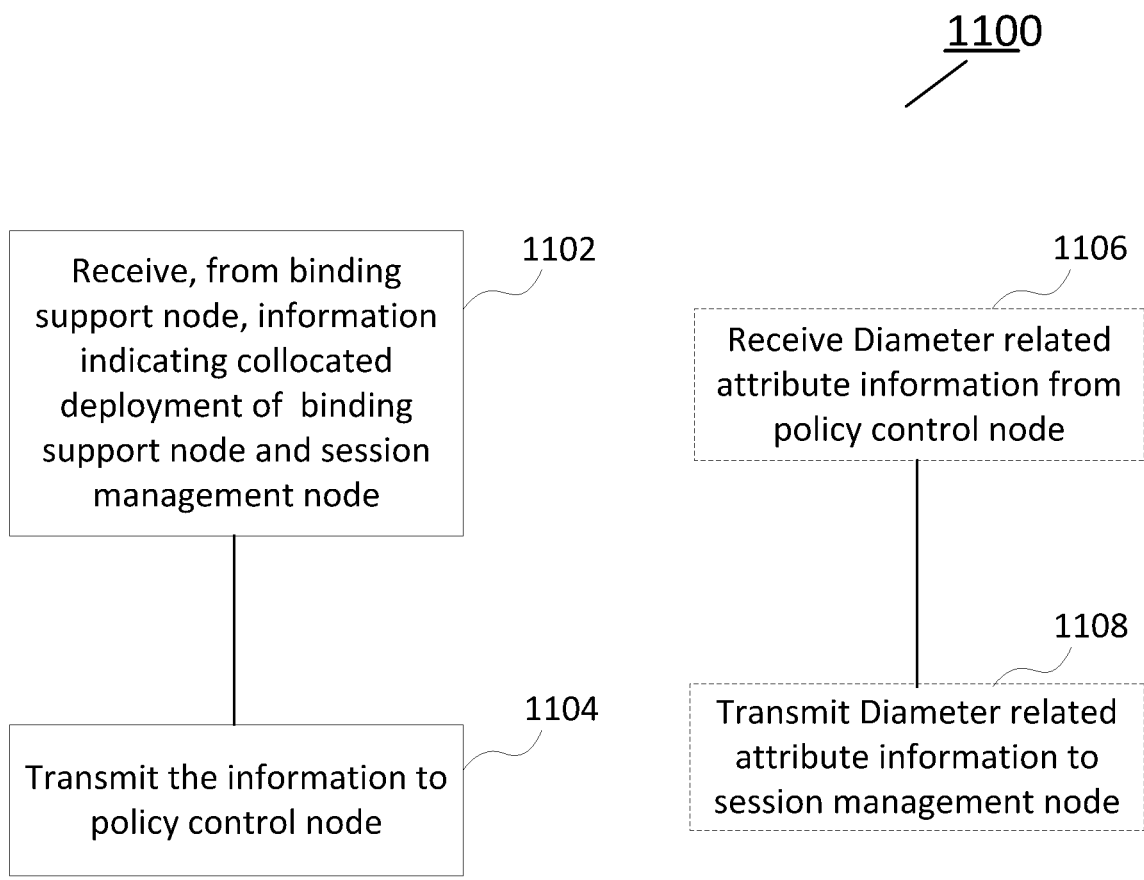
FIG. 11 illustrates a flowchart of a method implemented at a network repository node in a wireless communication network according to some embodiments of the present disclosure.

Reference is now made to FIG. 11, which shows a flowchart of a method 1100 according to some embodiments of the present disclosure. The method 1100 may be implemented at the network repository node (e.g. NRF as shown in FIG. 1).

As shown in FIG. 1100, at block 1102, the network repository node may receive, from the binding support node such as BSF in FIG. 1, the information indicating a collocated deployment of a session management node and the binding support node.

In some embodiments, the network repository node may receive the information during the registration procedure for the binding support node. As described above, when the binding support node registers its service with the network repository node, the binding support node may include the information indicating that it is collocated with the session management node in the NF profile and send it to the network repository node. In an embodiment, the information is transmitted in the registration request such as Nnrf_NFManagement_NFRegister Request as shown in 501 of FIG. 5.

Additionally, in some embodiments, the network repository node may transmit the information to the policy control node, at block 1104. In an embodiment, the information may be transmitted during a discovery procedure for the binding support node initiated by the policy control node. When the policy control node needs to discover the binding support node to register its binding information, the policy control node may initiate the discovery procedure with the network repository node. The network repository node may transmit the information in the discovery response. For example, the discovery response may be Nnrf_NFDiscovery_Response as shown in 505 of FIG. 5.

Additionally, in some embodiments, the network repository node may receive the Diameter related attribute information of the policy control node from the policy control node, at block 1106. In an embodiment, the network repository node may receive the Diameter related attribute information during the registration procedure for the policy control node. As described above, the policy control node may transmit the Diameter related attribute information when registering its service with the network repository node. Therefore, the network repository node may receive the Diameter related attribute information in the registration request, such as Nnrf_NFManagement_NFRegister Request as shown in 801 of FIG. 8.

Additionally, in some embodiments, the network repository node may transmit the Diameter related attribute information to the session management node, at block 1108. In an embodiment, the Diameter related attribute information may be transmitted during a discovery procedure for the policy control node initiated by the session management node. When the session management node initiates the discovery procedure with the network repository node to select the policy control node, the network repository node may transmit the Diameter related attribute information in the discovery response. For example, the discovery response may be Nnrf_NFDiscovery_Response as shown in 804 of FIG. 8.

The various blocks shown in FIGS. 2, 7 and 9-11 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 12:
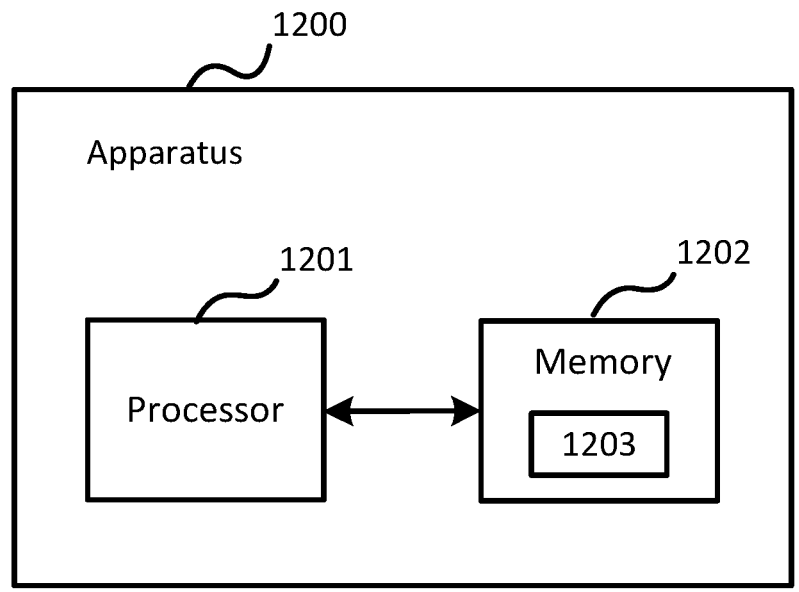
FIG. 12 illustrate a simplified block diagram of an apparatus according to some embodiments of the present disclosure.

FIG. 12 illustrates a simplified block diagram of an apparatus 1200 according to some embodiments of the present disclosure. As shown in FIG. 12, the apparatus 1200 may comprise one or more processors such as processor 1201 and one or more memories such as memory 1202 storing computer program codes 1203. The memory 1202 may be non-transitory machine/processor/computer readable storage medium. In accordance with some exemplary embodiments, the apparatus 1200 may be implemented as an integrated circuit chip or module that can be plugged or installed into a policy control node as described with respect to FIG. 2 or FIG. 7, or a session management node as described with respect to FIG. 9, or a binding support node as described with respect to FIG. 10, or a network repository node as described with respect to FIG. 11.

In some implementations, the one or more memories 1202 and the computer program codes 1203 may be configured to, with the one or more processors 1201, cause the apparatus 1200 at least to perform any operation of the methods as described in connection with FIG. 2 or FIG. 7. In such embodiments, the apparatus 1200 may be implemented as at least part of or communicatively coupled to the policy control node as described above. As a particular example, the apparatus 1200 may be implemented as a policy control node.

In other implementations, the one or more memories 1202 and the computer program codes 1203 may be configured to, with the one or more processors 1201, cause the apparatus 1200 at least to perform any operation of the method as described in connection with FIG. 9. In such embodiments, the apparatus 1200 may be implemented as at least part of or communicatively coupled to the session management node as described above. As a particular example, the apparatus 1200 may be implemented as a session management node.

In other implementations, the one or more memories 1202 and the computer program codes 1203 may be configured to, with the one or more processors 1201, cause the apparatus 1200 at least to perform any operation of the methods as described in connection with FIG. 10. In such embodiments, the apparatus 1200 may be implemented as at least part of or communicatively coupled to the binding support node as described above. As a particular example, the apparatus 1200 may be implemented as a binding support node.

In other implementations, the one or more memories 1202 and the computer program codes 1203 may be configured to, with the one or more processors 1201, cause the apparatus 1200 at least to perform any operation of the method as described in connection with FIG. 11. In such embodiments, the apparatus 1200 may be implemented as at least part of or communicatively coupled to the network repository node as described above. As a particular example, the apparatus 1200 may be implemented as a network repository node.

Alternatively or additionally, the one or more memories 1202 and the computer program codes 1203 may be configured to, with the one or more processors 1201, cause the apparatus 1200 at least to perform more or less operations to implement the proposed methods according to the exemplary embodiments of the present disclosure.

Figure 13:
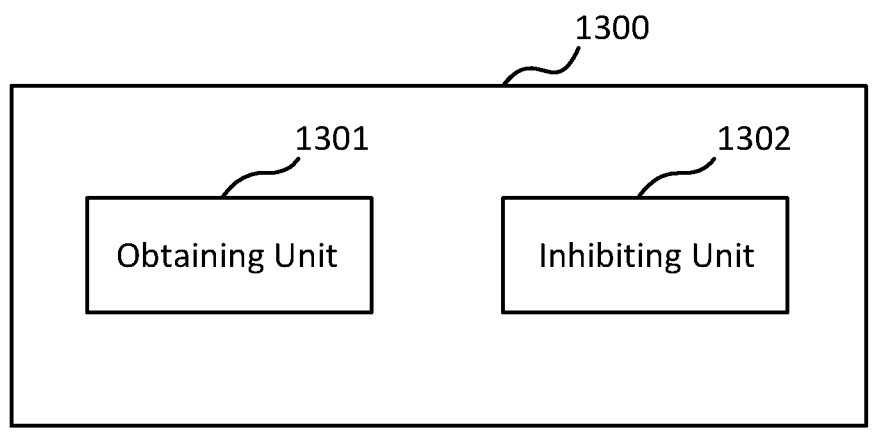
FIG. 13 illustrates a simplified block diagram of a policy control node according to some embodiments of the present disclosure.

FIG. 13 is a block diagram illustrating a policy control node 1300 according to some embodiments of the present disclosure. As shown in FIG. 13, the policy control node 1300 may comprise an obtaining unit 1301 and an inhibiting unit 1302. The obtaining unit 1301 may be operable to carry out the operation in block 202 or 702, and the inhibiting unit 1302 may be operable to carry out the operation in block 204 or 704. Optionally, the obtaining unit 1301 and/or the inhibiting unit 1302 may be operable to carry out more or less operations to implement the proposed methods according to the exemplary embodiments of the present disclosure.

Figure 14:
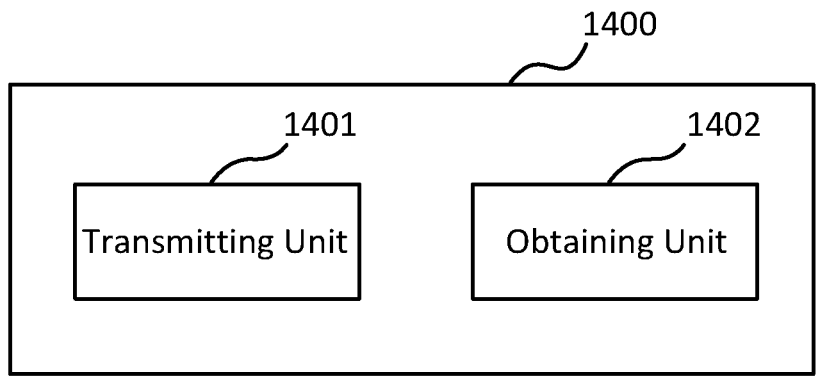
FIG. 14 illustrates a simplified block diagram of a session management node according to some embodiments of the present disclosure.

FIG. 14 is a block diagram illustrating a session management node 1400 according to some embodiments of the present disclosure. As shown in FIG. 14, the session management node 1400 may comprise a transmitting unit 1401. The transmitting unit 1401 may be operable to carry out the operation in block 902. Further the session management node 1400 may comprise an obtaining unit 1402. The obtaining unit 1402 may be operable to carry out the operation in block 904. Optionally, the transmitting unit 1401 and/or the obtaining unit 1402 may be operable to carry out more or less operations to implement the proposed methods according to the exemplary embodiments of the present disclosure.

Figure 15:
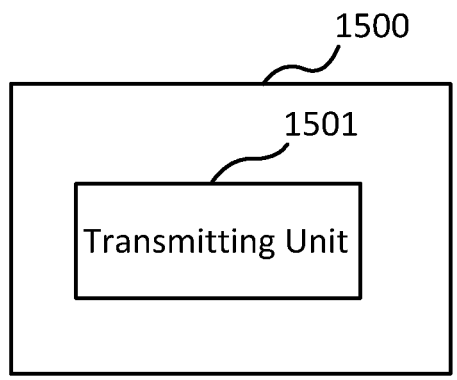
FIG. 15 illustrates a simplified block diagram of a binding support node according to some embodiments of the present disclosure.

FIG. 15 is a block diagram illustrating a binding support node 1500 according to some embodiments of the present disclosure. As shown in FIG. 15, the binding support node 1500 may comprise a transmitting unit 1501. The transmitting unit 1501 may be operable to carry out the operation in block 1002. Optionally, the transmitting unit 1501 may be operable to carry out more or less operations to implement the proposed methods according to the exemplary embodiments of the present disclosure.

Figure 16:
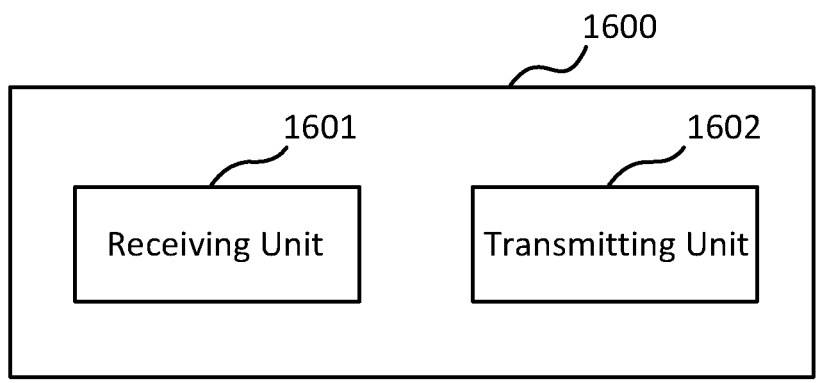
FIG. 16 illustrates a simplified block diagram of a network repository node according to some embodiments of the present disclosure.

FIG. 16 is a block diagram illustrating a network repository node 1600 according to some embodiments of the present disclosure. As shown in FIG. 16, the network repository node 1600 may comprise a receiving unit 1601. The receiving unit 1601 may be operable to carry out the operation in block 1102. Further the network repository node 1600 may comprise a transmitting unit 1602. The transmitting unit 1602 may be operable to carry out the operation in block 1104. Optionally, the receiving unit 1601 and/or the transmitting unit 1602 may be operable to carry out more or less operations to implement the proposed methods according to the exemplary embodiments of the present disclosure.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method implemented at a policy control node in a wireless communication network comprising:

transmitting Diameter related attribute information to a network repository node during a registration procedure of the policy control node to enable the network repository node to provide the Diameter related attribute information to a session management node during a discovery procedure for the policy control node initiated by the session management node, wherein the Diameter related attribute information comprises an identifier of a Diameter host and a Diameter realm for the policy control node.

2. The method according to claim 1, further comprising:

obtaining information indicating a collocated deployment of the session management node and a binding support node; and inhibiting, in response to the information, a registration of binding information to the binding support node.

3. The method according to claim 2, wherein the obtaining the information indicating the collocated deployment of the session management node and the binding support node comprises:

receiving, from the session management node, the information in a session management policy association create request or a session management policy association modification request.

4. The method according to claim 2, wherein the obtaining the information indicating the collocated deployment of the session management node and the binding support node comprises:

receiving, from the network repository node, the information during a discovery procedure for the network repository node.

5. A method implemented at a session management node in a wireless communication network comprising:

receiving Diameter related attribute information of a policy control node from a network repository node during a discovery procedure for the policy control node, the Diameter related attribute information obtained by the network repository node during a registration procedure of the policy control node, wherein the Diameter related attribute information comprises an identifier of a Diameter host and a Diameter realm for the policy control node.

6. The method according to claim 5, further comprising:

transmitting, to the policy control node, information indicating a collocated deployment of the session management node and a binding support node.

7. The method according to claim 6, wherein the information indicating the collocated deployment of the session management node and the binding support node is transmitted, to the policy control node, in a session management policy association create request or a session management policy association modification request.

8. A method implemented at a network repository node in a wireless communication network comprising:

receiving, from a policy control node, Diameter related attribute information of the policy control node during a registration procedure for the policy control node, wherein the Diameter related attribute information comprises an identifier of a Diameter host and a Diameter realm for the policy control node; and transmitting the Diameter related attribute information to a session management node during a discovery procedure for the policy control node initiated by the session management node.

9. The method according to claim 8, further comprising:

receiving, from a binding support node, information indicating a collocated deployment of the session management node and a binding support node during a registration procedure for the binding support node; and transmitting, to the policy control node, the information during a discovery procedure for the policy control node.

10. A policy control node in a wireless communication network comprising:

one or more processors; and one or more memories containing computer program codes which, when executed by said one or more processors, cause said policy control node to:

transmit Diameter related attribute information to a network repository node during a registration procedure of the policy control node to enable the network repository node to provide the Diameter related attribute information to a session management node during a discovery procedure for the policy control node initiated by the session management node, wherein the Diameter related attribute information comprises an identifier of a Diameter host and a Diameter realm for the policy control node.

11. A session management node in a wireless communication network comprising:

one or more processors; and one or more memories containing computer program codes which, when executed by said one or more processors, cause said session management node to:

receive Diameter related attribute information of a policy control node from a network repository node during a discovery procedure for the policy control node, the Diameter related attribute information obtained by the network repository node during a registration procedure of the policy control node, wherein the Diameter related attribute information comprises an identifier of a Diameter host and a Diameter realm for the policy control node.

12. A network repository node in a wireless communication network comprising:

one or more processors; and one or more memories containing computer program codes which, when executed by said one or more processors, cause said network repository node to:

receive, from a policy control node, Diameter related attribute information of the policy control node during a registration procedure for the policy control node, wherein the Diameter related attribute information comprises an identifier of a Diameter host and a Diameter realm for the policy control node; and transmit the Diameter related attribute information to a session management node during a discovery procedure for the policy control node initiated by the session management node.

* * * * *